United States Patent [19]
Watanabe et al.

[11] Patent Number: 6,047,978
[45] Date of Patent: Apr. 11, 2000

[54] WHEEL SUSPENSION BY TRAILING ARMS AND TORSION BEAM ASSEMBLED BY WELDING WITH MEANS FOR RELIEVING WELD SEAM FROM HIGH STRESS

[75] Inventors: Kei Watanabe, Toyota; Satoshi Murata, Nishikamo-gun; Hiroyuki Shimatani, Toyota, all of Japan

[73] Assignee: Toyota Jidosha Kabushiki Kaisha, Toyota, Japan

[21] Appl. No.: 09/020,821

[22] Filed: Feb. 9, 1998

[30] Foreign Application Priority Data

Feb. 27, 1997 [JP] Japan ................................ 9-060048

[51] Int. Cl.[7] ............................................. B60G 11/18
[52] U.S. Cl. ........................... 280/124.106; 280/124.128; 267/273
[58] Field of Search .................... 280/124.166, 124.106, 280/124.128; 267/273

[56] References Cited

U.S. PATENT DOCUMENTS

| | | | |
|---|---|---|---|
| 4,165,098 | 8/1979 | Wagner | 280/708 |
| 4,232,881 | 11/1980 | Kolbel et al. | 280/721 |
| 4,486,030 | 12/1984 | Takata et al. | 280/689 |
| 5,597,175 | 1/1997 | Tuan | 280/723 |

FOREIGN PATENT DOCUMENTS

| | | |
|---|---|---|
| 27 35 939 B1 | 2/1979 | Germany. |
| 195 18 756 A1 | 10/1996 | Germany. |
| B-61-41768 | 9/1986 | Japan. |
| 5-69713 | 3/1993 | Japan ............................ 280/FOR 180 |
| 7-276942 | 10/1995 | Japan. |

*Primary Examiner*—Paul N. Dickson
*Attorney, Agent, or Firm*—Oliff & Berridge, PLC

[57] ABSTRACT

In a wheel suspension of a vehicle such as an automobile assembled from a pair of trailing arms arranged to extend substantially longitudinally of the vehicle in a laterally symmetrical relationship thereto with each front end thereof being pivotably mounted to the vehicle body while each rear end thereof rotatably supporting a corresponding one of either a pair of front wheels or a pair of rear wheels, and a torsion beam arranged to extend substantially laterally of the vehicle between the pair of trailing arms with opposite ends thereof being firmly connected thereto by welding, so as to form a link assembly assembled by a weld seam formed therebetween, the link is formed with at least one notch adjacent to a weld seam for relieving a surface tensile stress exerted across the weld seam according to a force acting between the trailing arms and the torsion beam.

3 Claims, 4 Drawing Sheets

WHEEL SUSPENSION BY TRAILING ARMS AND TORSION BEAM ASSEMBLED BY WELDING WITH MEANS FOR RELIEVING WELD SEAM FROM HIGH STRESS

BACKGROUND OF THE INVENTION

1. Field of the Invention

The present invention related to a wheel suspension of vehicles such as automobiles, and more particularly, to an improvement of a wheel suspension assembled from a pair of trailing arms and a torsion beam by welding, the improvement concerning the durability of the weld portion.

2. Description of the Prior Art

As a type of wheel suspension of four wheeled vehicles, there is known a torsion beam type wheel suspension for a pair of front wheels or a pair of rear wheels which is constructed from a pair of trailing arms arranged to extend substantially longitudinally relative to the vehicle body in a laterally symmetrical relationship thereto, each first end of the trailing arms being pivotably mounted to the vehicle body, while each second end thereof opposite to the first end rotatably supporting a corresponding one of the pair of front or rear wheels, and a torsion beam arranged to extend substantially laterally relative to the vehicle body between the pair of trailing arms with opposite ends thereof being firmly connected to the pair of trailing arms by welding, so as to form a suspension link assembly having a form of substantially the letter of H or a staple according to the longitudinal position of the torsion beam along the trailing arms. The wheel suspension of this type provides an advantage that, when the vehicle is driven on a rough ground presenting different irregularities to the left and right wheels, the vehicle body is less liable to a heavy rolling of the pair of wheels.

However, the weld portion, or weld seam, along which each of the opposite ends of the torsion beam abutted against a middle portion of each corresponding one of the trailing arms is welded thereto is subjected to a high tensile stress, when the pair of trailing arms are substantially biased relative to one another such that, for example, the left wheel bounds due to running on a convex irregularity, while the right wheel rebounds due to dropping in a concave irregularity, or vice versa, thereby substantially twisting the torsion beam, or when a strong lateral force is applied to the wheels due to a sharp turning of the vehicle, thereby applying a lateral bending to the trailing arms around the joint portion between the trailing arms and the torsion beam. It will be noted that a weld seam formed along a surface border of two abutted members is particularly sensitive to a force acting to separate one from the other of the two members.

SUMMARY OF THE INVENTION

In view of the above, it is a primary object of the present invention to improve the above-mentioned torsion beam type wheel suspension so that the stress applied to the weld seam between the trailing arms and the torsion beam is decreased without substantially affecting the torsional performance of the wheel suspension.

It is a further object of the present invention to provide such an improved torsion beam type wheel suspension with no need of substantial change of the existing designs of the torsion beam type wheel suspension.

According to the present invention, the above-mentioned objects are accomplished by a wheel suspension of a vehicle having a vehicle body and a pair of front wheels and a pair of rear wheels, comprising a pair of trailing arms arranged to extend substantially longitudinally of the vehicle in a laterally symmetrical relationship thereto with each front end thereof being pivotably mounted to the vehicle body while each rear end thereof opposite to said front end rotatably supporting a corresponding one of either the pair of front wheels or the pair of rear wheels, and a torsion beam arranged to extend substantially laterally of the vehicle between the pair of trailing arms with opposite ends thereof being firmly connected thereto by welding so as to form a link assembly assembled by a weld seam formed therebetween, wherein the link is formed with at least one notch adjacent to the weld seam for relieving a surface tensile stress exerted across the weld seam according to a force acting between the trailing arms and the torsion beam.

In the above-mentioned torsion beam type wheel suspension, a pair of trailing arms and a torsion beam are generally assembled together such that each of the opposite ends of the torsion beam is abutted to a middle portion of each corresponding one of the trailing arms, wherein the abutting end of the torsion beam is beforehand three dimensionally shaped to fit with a cross sectional outer configuration of the middle portion of the trailing arm, so as thereby to define a linear border along which the surface of the torsion beam meets with the surface of the trailing arm, and then the two meeting surface portions are connected with one another by a weld seam generated by an electric arc welding or the like applied thereto from the outside of the abutted portions of the two members. Therefore, weld bead remains along the connection between the torsion beam and the trailing arms with a convex surface thereof being exposed to the atmosphere in a condition reserving a tensile stress in a surface layer thereof. Such a condition that the weld bead is formed along the surface of the link construction is the same when an angular patch or a T-patch is attached over the abutting portion between the trailing arm and the torsion beam.

On the other hand, when the torsion beam is twisted due to a relative angular biasing between the pair of trailing arms due to an asymmetrical bounding or rebounding of the pair of wheels, or when the trailing arms are laterally bent around the connecting portions between the trailing arms and the torsion beam due to a centrifugal force generated by a turn running of the vehicle, it is the surface portion of the weld bead that is most highly loaded with a tensile stress.

Therefore, when a notch of an appropriate shaped and size is formed at an appropriate portion of the link assembly adjacent to the weld seam, a peak surface tension applied to the surface layer of the weld bead is effectively relieved, so as not to initiate a fracture of the weld seam therefrom, without substantially affecting the mechanical performance of the link assembly.

Such a notch may be formed at the torsion beam at a portion thereof adjacent to the weld seam. In this case, when the torsion beam has a substantially U-shaped cross section having a pair of edge portions, so that the weld seam extends along a corresponding substantially U-shape, the notch may be formed at at least one of the pair of edge portions of the torsion beam adjacent to the weld seam.

Alternatively, or at the same time, the notch may be formed at the trailing arm at a portion thereof adjacent to the weld seam.

The wheel suspension may further comprise an angle patch bridged between the torsion beam and the trailing arm, with a weld seam being formed between the torsion beam and the angle patch to extend laterally of the vehicle and between the trailing arm and the angle patch to extend longitudinally of the vehicle, wherein the notch may be formed at a portion of the torsion beam adjacent to an inboard end of the weld seam formed between the torsion beam and the angle patch.

When such an angle patch is provided, the notch may, alternatively or at the same time, be formed at a portion of the trailing arm adjacent to a rear end of the weld seam formed between the trailing arm and the angle patch.

When such an angle patch is provided, the notch may be formed at a portion of the angle patch at a middle portion of a corner thereof. As a modification, such a notch may be formed in a relatively broad curvaceous shape to smoothly extend over substantially a whole corner of the angle patch.

As a further modification, the wheel suspension may be provided with a T-patch bridged between the torsion beam and the trailing arm, with a weld seam being formed between the torsion beam and the T-patch to extend longitudinally of the vehicle and between the trailing arm and the T-patch to extend longitudinally of the vehicle, wherein the notch may be formed in a relatively broad curvaceous shape to smoothly extend over substantially a whole corner of the T-patch.

BRIEF DESCRIPTION OF THE DRAWINGS

In the accompanying drawings.

DESCRIPTION OF THE EMBODIMENTS

In the following, the present invention will be described in more detail in the form of some preferred embodiments.

Figure 1:
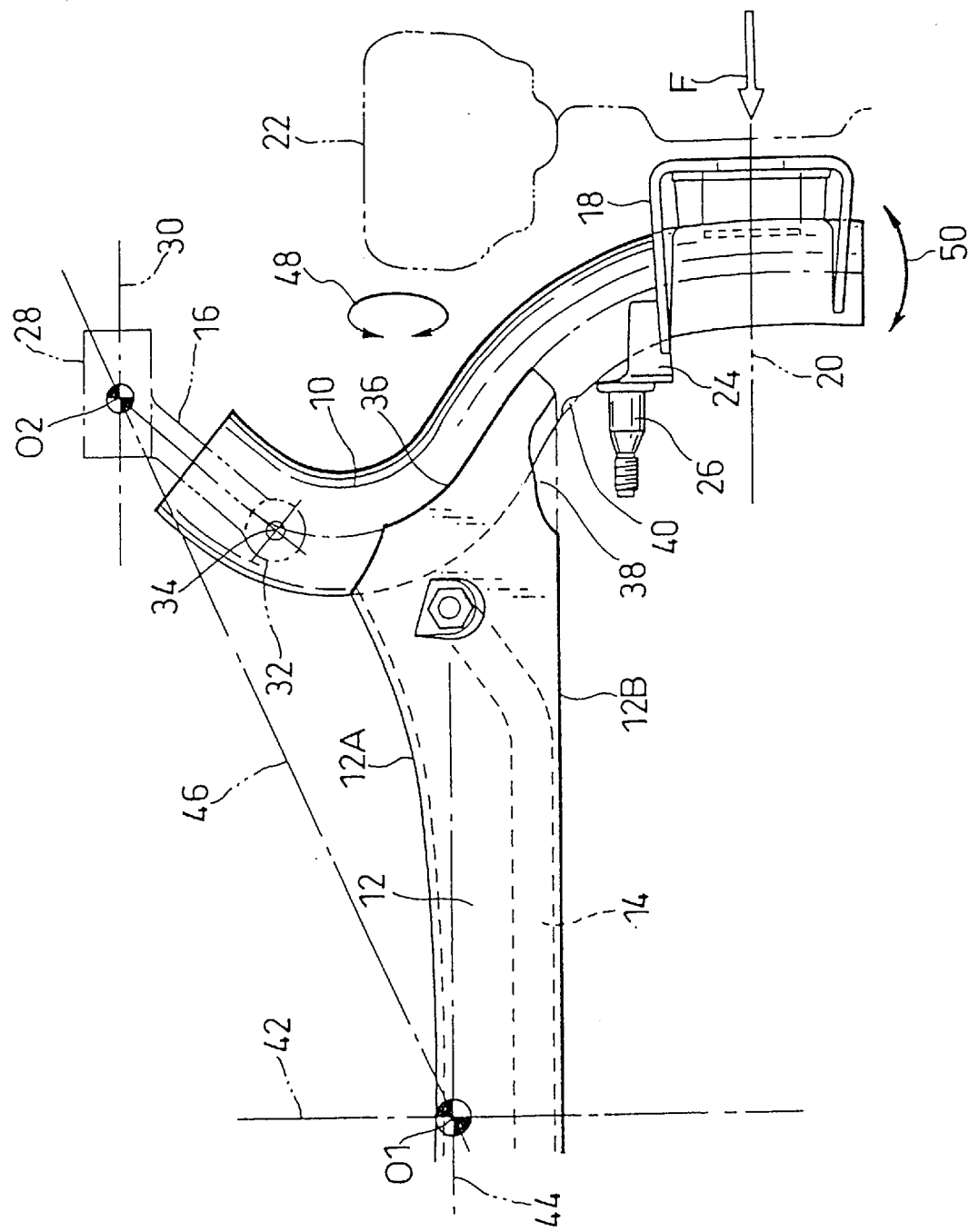
FIG. 1 is a plan view of an example of the torsion beam type wheel suspension, showing a right half portion thereof, in which the present invention is incorporated as a first embodiment.

Referring to FIG. 1, 10 designates one of a pair of trailing arms arranged to extend substantially longitudinally relative to a vehicle body (not shown) having a longitudinal center line 42. The trailing arm 10 is pivotably mounted at its front end located upward in the figure to the vehicle body by a control link 16 which is connected at its front end with the vehicle body via a rubber bush 28 and at its rear end with the front end of the trailing arm 10 via a rubber bush 32, so that the trailing arm 10 is pivotable up and down generally around a pivot arms 30 passing through the center of the rubber bush 28. The control link 16 is horizontally tiltable relative to the vehicle body around a rubber bush center O2 and relative to the front end of the trailing arm 10 around a vertical axis 34. The rear end of the trailing arm 10 carries a bracket 18 for supporting a wheel 22, i.e. a rear wheel in the shown embodiment, via a hub member, to be rotatable around an axis 20. A bracket 24 bearing a shaft 26 for connection with a lower end of a shock absorber not shown in the figure is also mounted to the rear end of the trailing arm 10.

A torsion beam 12 arranged to extend substantially laterally relative to the vehicle body is provided as a beam member having a U-shaped cross section open rearward of the vehicle, the beam member being symmetrical relative to the vehicle center line 42. The torsion beam 12 is torsionally reinforced by a torsion bar 14 mounted therein, and has a twisting axis 44.

The opposite ends of the torsion beam 12 are each slightly enlarged along a front edge portion 12A as shown in the figure, while a rear edge portion 12B formed as a pail of plate portions is laterally expanded relative to the front edge portion 12A, so as to fit with a curved outer configuration of the trailing arm 10. Thus, a U-shaped cut end 36 of the torsion beam 12 is closely fitted with a cross sectional outer configuration of the trailing arm 10 which is a tubular member having a circular cross section in the shown embodiment. The torsion beam 12 and the trailing arm 10 are firmly connected with one another by welding applied along a border defined therebetween, the welding being effected by an electric arc or the like to form a weld seam along the U-shaped cut end 36 of the torsion beam 12. The line 36 will be called "weld seam" hereinunder for the convenience of description.

The link assembly thus assembled from a pair of trailing arms 10 and the torsion beam 12 (including torsion bar 14) is deformed according to a relative angular biasing between the pair of trailing arms such that the right side trailing arm 10 and a right side half of the torsion beam 12 turn around a straight line 46 connecting the rubber bush center O2 and a point of intersection O1 between the vehicle center line 42 and the twisting axis 44 of the torsional beam 12, while the left side trailing arm and the left side half of the torsion beam, both not shown in the figure, turn around a straight line symmetrical to the line 46 relative to the vehicle center line 42, in a direction opposite to that of the combination of the right side trailing arm and the right side half of the torsion beam.

According to an embodiment of the present invention, a notch, indeed a pair of notches, 38 are formed at the pair of rear edge portions 12B of the torsion beam 12 adjacent to the weld seam 36 formed between the torsion beam 12 and the trailing arm 10, so as effectively to relieve the surface tensile stress exerted across the weld seam 36.

When the torsion beam 12 is twisted due to a relative angular biasing between the left and right trailing arms 10, as illustrated by circular arrows 48, the tensile stress exerted across the weld seam 36 will be highest at the rear edge portions 12B, because the rear edge portions 12B are stretched at the highest ratio as they are most distant from the twisting axis 44. Therefore, the position of the notches 38 will be a most effective one for relieving the tensile stress peak transmitted through the weld seam 36.

When the trailing arm 10 is applied with a lateral force due to a turn running of the vehicle, as illustrated by arcuate arrows 50, so as to deform the relationship between the trailing arm 10 and the torsion beam 12 toward increasing or decreasing the angle between the trailing arm 10 and the rear edge portions 12B of the torsion beam 12, the rear edge portions 12B will also be one of the portions which will apply a high tensile stress across the weld seam 36. Therefore, it is also effective to form a stress relieving notch 40 at a position close to the notch 38 against applying a high tensile stress across the weld seam due to the turn running of the vehicle.

It is desirable that the notches are formed in a shallow moderate curve such as shown by 38 in FIG. 1.

Although not shown in FIG. 1, it will be appreciated that a similar notch may be formed at the front edge portion 12A adjacent to the weld seam 36 for the same effects as the notches 38 in place of the notches 38 for some convenience of design of the suspension, or in addition to the notches 38.

Figure 2:
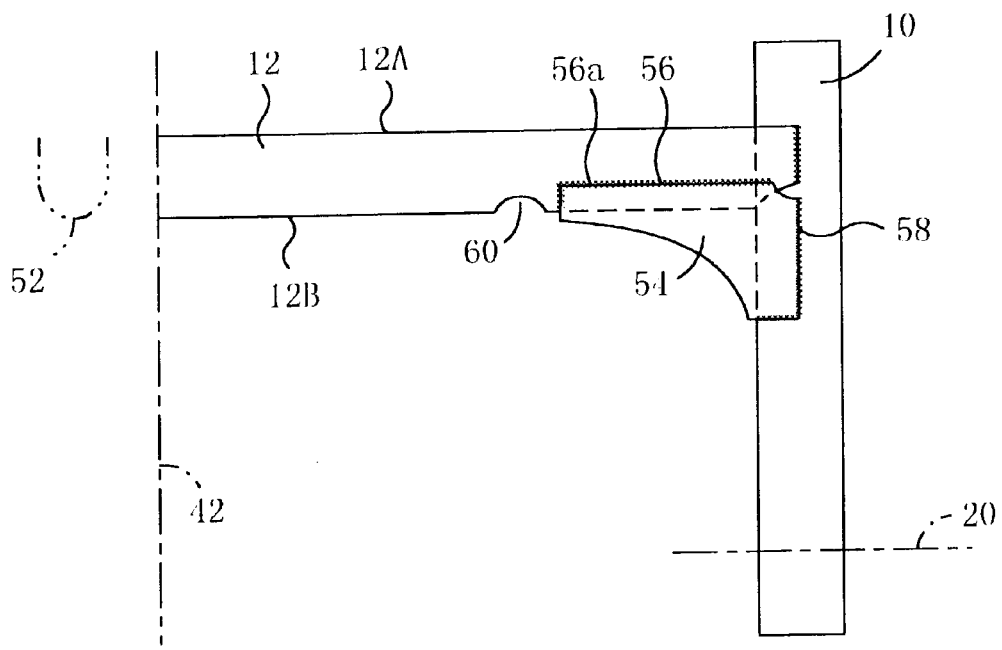
FIG. 2 is a plan view similar to FIG. 1 but more diagrammatical, showing another example of the torsion beam type wheel suspension, in which the present invention is incorporated as a second embodiment.

FIG. 2 shows a second embodiment of the present invention, wherein the trailing arms 10 and the torsion beam 12 are assembled together with a pair of angle patches 54 each applied to the connecting portion of one end of the torsion beam and one of the trailing arms. In FIG. 2, although the trailing arm and the torsion beam are somewhat diagrammatically shown, the portions corresponding to those shown in FIG. 1 are designated by the same reference numerals as in FIG. 1. However, it is to be noted that the direction of opening of the U-shaped cross section of the torsion beam 12 is opposite to that of the torsion beam of FIG. 1. The angle patch 54 is formed to present a generally U-shaped concave cross section toward the trailing arm 10 having a generally tubular construction and toward the torsion beam 12 having a generally U-shaped cross section open upward as viewed in the figure as illustrated by a phantom line 52, so that the angle patch 54 closely fits both of the trailing arm 10 and the torsion beam 12. The angle patch 54 is firmly fixed to the trailing arm 10 and the torsion beam 12 by welding, forming weld seams 56 and 58, respectively, thereby firmly connecting the trailing arm 10 and the torsion beam 12 to one another.

In this embodiment, a notch 60 is formed in the torsion beam 12 at a position located along a rear edge portion thereof, or at a bottom of its U-shaped cross section, adjacent to the weld seam 56. When the torsion beam 12 is twisted due to unbalanced bounding and rebounding of the left and right wheels, a part of the weld seam 56 designated by 56a will be exerted a highest tensile stress as a front of the connection of the torsion beam and the trailing arm exposed to the twisting motion of the torsion beam. Therefore, the notch 60 is considered to be most effective for reducing the highest tensile stress exerted across the weld seam 56.

Figure 3:
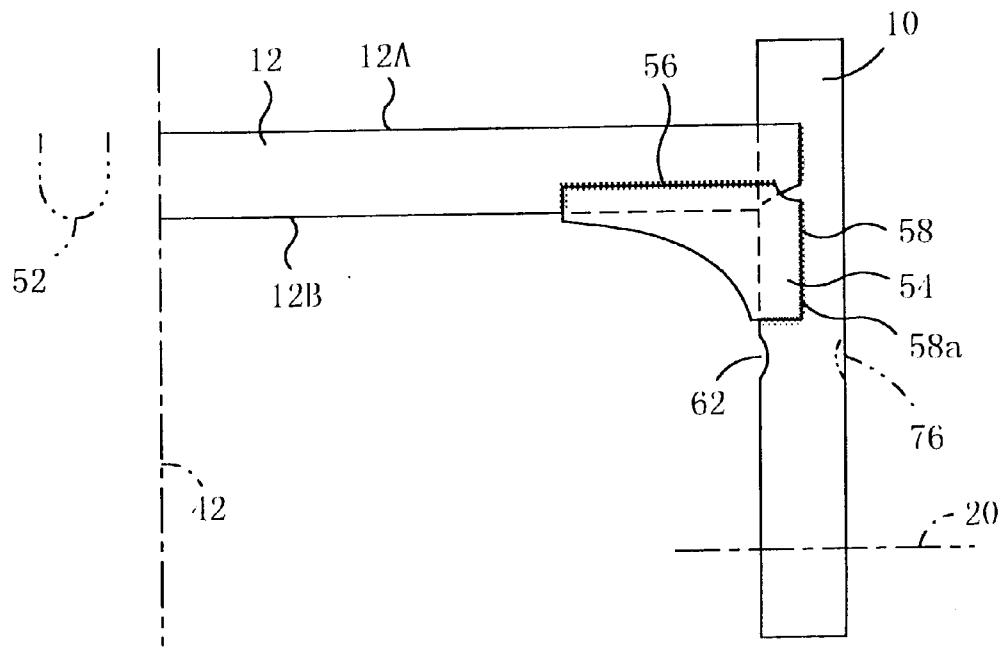
FIGS. 3–6 are views similar to FIG. 2, showing other embodiments of the present invention.

FIG. 3 shows a third embodiment of the present invention having the same construction as that of the embodiment shown in FIG. 2 with regard to assembling the trailing arms 10 and the torsion beam 12 with the angle patches 54, wherein, however, a notch, indeed a pair of notches, 62 is formed in the trailing arm 10 at a position along an inboard edge portion thereof adjacent to a rear end portion 58a of the weld seam 58. In FIG. 3, the portions corresponding to those shown in FIGS. 1 and 2 are also designated by the same reference numerals. It will be appreciated that the notch 62 in this embodiment is effective for relieving a rear end portion 58a of the weld seam 58 from being exerted a highest tensile stress thereacross due to a side force applied to the suspension when the vehicle makes a turn. Further, a notch such as 76 may be formed at the outboard side of the trailing arm 10 to be close to the rear end of the weld seam 58, so as further to decrease the highest tensile stress exerted across the weld seam 58.

It will be appreciated that the notch 60 of FIG. 2 and the notch 62 and/or notch 76 of FIG. 3 may be formed in the same suspension.

Figure 4:
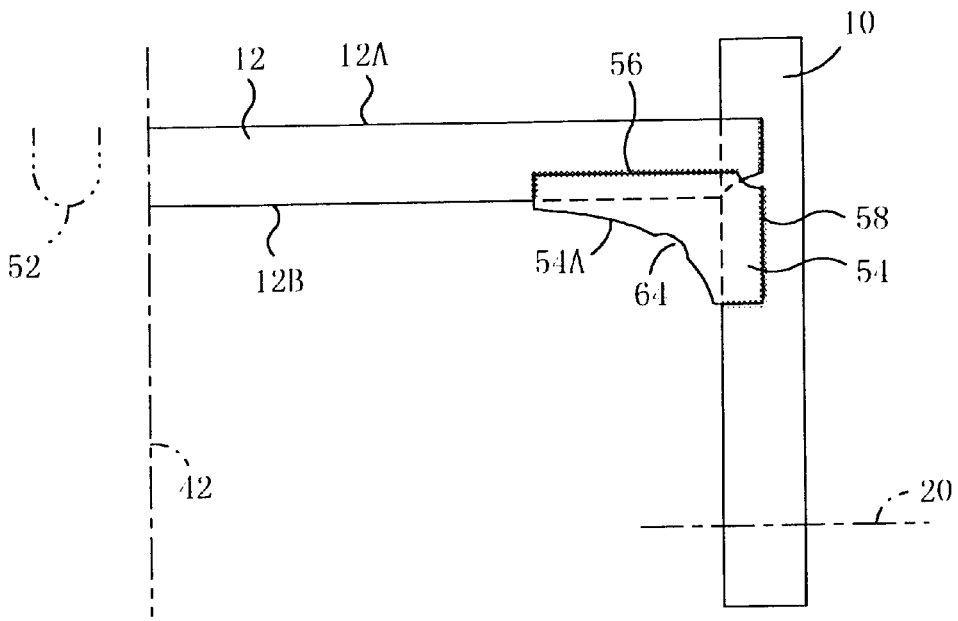

FIG. 4 is a view similar to FIGS. 2 and 3, showing another embodiment of the present invention. In FIG. 4, the portions corresponding to those shown in FIGS. 2 and 3 are designated by the same reference numerals as in those figures. In this embodiment, a notch 64 is formed at a middle portion of the corner 54A of the angle patch 54. Such a notch is effective for decreasing the highest tensile stress exerted across both of the portions 56a and 58a.

It will also be appreciated that the notch 60 of FIG. 2, the notch 62 and/or the notch 76 of FIG. 3 and the notch 64 of FIG. 4 may be formed in the same suspension.

Figure 5:
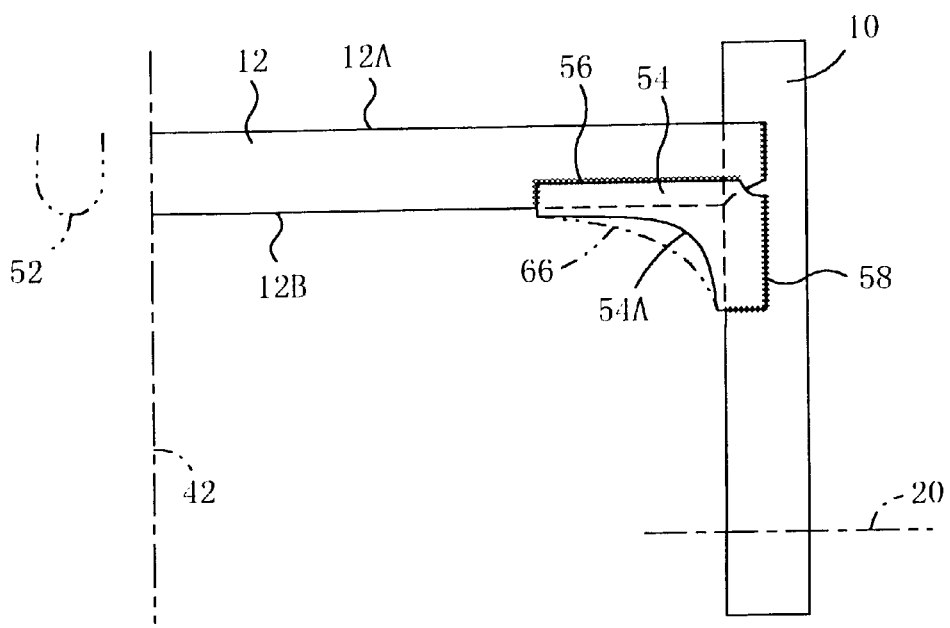

FIG. 5 shows a further embodiment analogous to that shown in FIG. 4. In FIG. 5, the portions corresponding to those shown in FIGS. 2–4 are designated by the same reference numerals as in those figures. In this embodiment, it is proposed to decrease the highest tensile stress exerted across the weld seams 54 and 58 by deepening the corner portion of the angle patch with a relatively broad curvaceous notch 54A of the same functional concept as the notch 64 of FIG. 64 as shown in the figure by contrast to the ordinary contour of the corner portion shown by a phantom line 66 of the ordinary angle patches in this art. By such a relatively broad curvaceous notch being formed to extend over substantially the whole corner of the angle patch, an increase of the angular flexibility of the angle patch is available, so that the tensile stress exerted across the weld seams 54 and 58 is correspondingly decreased.

Figure 6:
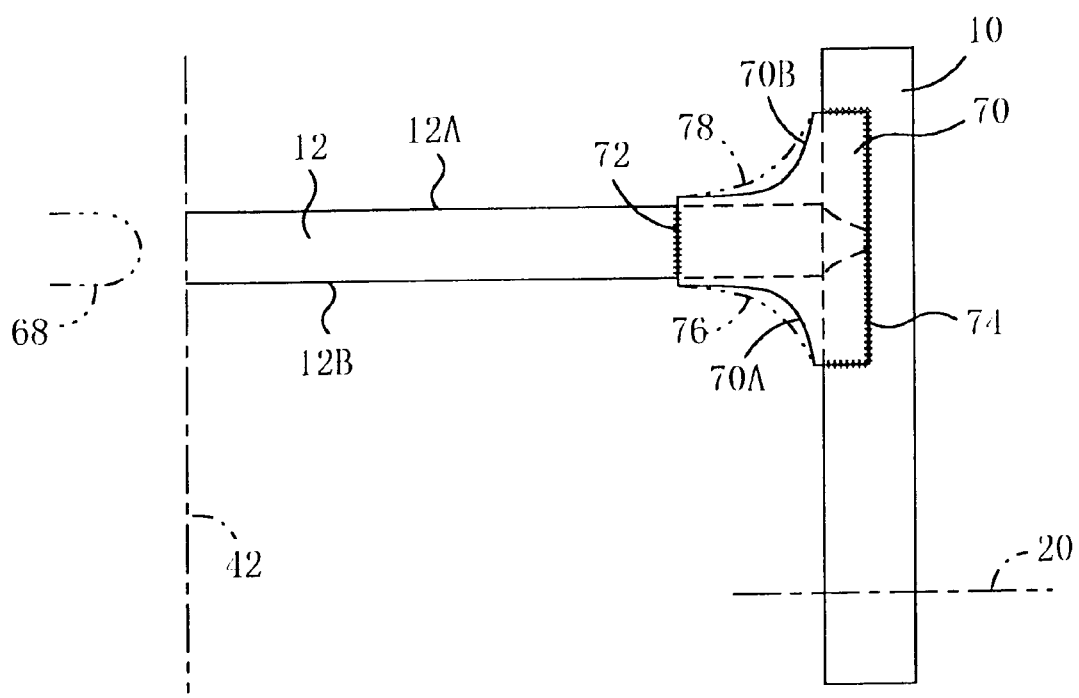

FIG. 6 shows a still further embodiment which has replaced the angle patch 54 of the embodiment of FIG. 5 by a T-patch 70 having a pair of curvaceous notches 70A and 70B. The contrast of the curvaceous notches 70A and 70B against the corner portion of the ordinary T-patches in this art is also shown by phantom lines 76 and 78 which are the contour of the latter. In FIG. 6, the portions corresponding to those shown in FIGS. 2–5 are designated by the same reference numerals as in those figures. However, it is to be noted that the torsion beam 12 has a U-shaped cross section open downward as shown by a phantom line 68. The T-patch 70 is welded with the torsion beam 12 and the trailing arm 10 along weld seams 72 and 74, respectively. In this case, the weld seam 72 is substantially relieved from being temporarily exerted with a peak tensile stress thereacross as in the preceding embodiments. As for the weld seam 74, a relatively long weld seam is available, so as correspondingly to decrease the peak tensile stress exerted thereacross.

It will also be appreciated that the measures for decreasing the peak tensile stress exerted across the weld seam by the embodiments shown in FIGS. 5 and 6 may be appropriately combined with one or more of the measures for the same purpose shown in the preceding figures.

Although the present invention has been described in detail with respect to several preferred embodiments thereof, it will be apparent for those skilled in the art that various modifications are possible with respect to the shown embodiments within the scope of the present invention.

What is claimed is:

1. A wheel suspension of a vehicle having a vehicle body and a pair of front wheels and a pair of rear wheels, comprising:

a pair of trailing arms arranged to extend substantially longitudinally of the vehicle in a laterally symmetrical relationship with respect to a longitudinal center line of the vehicle with a front end of each trailing arm of the pair of trailing arms being pivotably mounted to the vehicle body while a rear end of each trailing arm rotatably supports a corresponding wheel of one of the pair of front wheels or the pair of rear wheels, and a torsion beam of a substantially U-shaped cross-section extending laterally between the pair of trailing arms with opposite ends of the torsion beam being fixed to each trailing arm by welding forming a pair of substantially U-shaped weld seams, wherein the torsion beam is oriented to open the substantially U-shaped cross-section rearwardly and at least one edge of the pair of open edges of the torsion beam is formed with a notch adjacent each end of the torsion beam for relieving a surface tensile stress exerted across the weld seam.

2. A wheel suspension according to claim 1, wherein the notch is formed in the torsion beam at a portion thereof adjacent to the weld seam.

3. A wheel suspension according to claim 1, wherein the open edge of the torsion beam formed with the pair of notches is substantially straight except for a pair of portions thereof at which the edge is concave from the substantially straight contour because of the notches.

* * * * *